(12) United States Patent
Zhang et al.

(10) Patent No.: US 11,941,318 B2
(45) Date of Patent: Mar. 26, 2024

(54) AUDIO AND VIDEO PLAYING SYSTEM, PLAYING METHOD AND PLAYING DEVICE

(71) Applicants: Beijing BOE Optoelectronics Technology Co., Ltd., Beijing (CN); BOE Technology Group Co., Ltd., Beijing (CN)

(72) Inventors: Xiaomang Zhang, Beijing (CN); Xiangjun Peng, Beijing (CN); Tiankuo Shi, Beijing (CN); Chenxi Zhao, Beijing (CN); Shuo Zhang, Beijing (CN); Yifan Hou, Beijing (CN); Yan Sun, Beijing (CN); Li Tian, Beijing (CN); Jing Liu, Beijing (CN); Wei Sun, Beijing (CN); Zhihua Ji, Beijing (CN); Yanhui Xi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/785,717

(22) PCT Filed: Apr. 27, 2021

(86) PCT No.: PCT/CN2021/090202
§ 371 (c)(1),
(2) Date: Jun. 15, 2022

(87) PCT Pub. No.: WO2021/238550
PCT Pub. Date: Dec. 2, 2021

(65) Prior Publication Data
US 2023/0075878 A1  Mar. 9, 2023

(30) Foreign Application Priority Data
May 26, 2020  (CN) .......................... 202010455829.6

(51) Int. Cl.
*G06F 3/147* (2006.01)
*G06F 3/01* (2006.01)
*H04R 1/40* (2006.01)

(52) U.S. Cl.
CPC .............. *G06F 3/147* (2013.01); *G06F 3/013* (2013.01); *H04R 1/403* (2013.01)

(58) Field of Classification Search
CPC ......... G06F 3/147; G06F 3/013; H04R 1/403; H04R 1/32; H04R 1/24
See application file for complete search history.

(56) References Cited

U.S. PATENT DOCUMENTS

| 10,831,268 B1* | 11/2020 | Golard ................... G06F 3/167 |
| 2007/0296818 A1 | 12/2007 | Porwal |
| 2013/0121515 A1* | 5/2013 | Hooley ................. H04R 1/403 381/300 |

FOREIGN PATENT DOCUMENTS

| CN | 101010981 A | 8/2007 |
| CN | 102724604 A | 10/2012 |

(Continued)

OTHER PUBLICATIONS

PCT/CN2021/090202 international search report and written opinion.

*Primary Examiner* — Robert J Michaud
(74) *Attorney, Agent, or Firm* — IPro, PLLC

(57) ABSTRACT

The present application provides an audio and video playing system, a playing method and a playing device. The system comprises: a display device; a directional sound output module configured to output a directional sound signal; a tracking element configured to monitor a target visual area and to monitor the target display area on the display screen; and a processor, connected with the directional sound output module and the tracking element respectively, and configured to acquire a first audio and video data to be output in (Continued)

the target display area, display image information of the first audio and video data in the target display area, and output sound information of the first audio and video data to the directional sound output module such that the directional sound output module output a directional sound signal towards the target visual area.

17 Claims, 3 Drawing Sheets

(56) References Cited

FOREIGN PATENT DOCUMENTS

| | | |
|---|---|---|
| CN | 106603947 A | 4/2017 |
| CN | 111580678 A | 8/2020 |

* cited by examiner

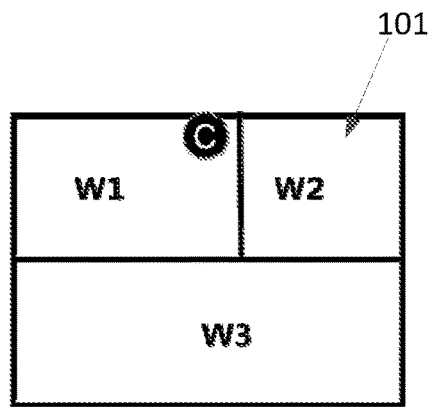

Fig. 3

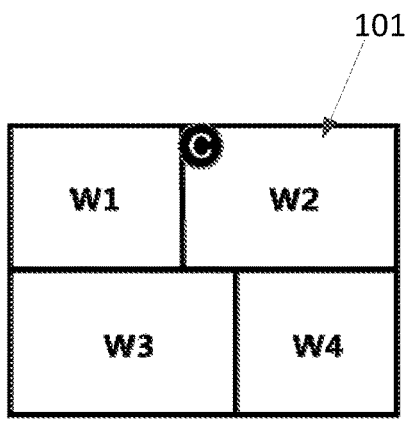

Fig. 4

| When a viewer is located within a visible range of a display screen of the display device, acquiring a target visual area where the viewer is located within the visible range and a target display area on the display screen when the viewer views the display screen | S510 |

| Displaying image information of a first audio and video data to be output in the target display area in the target display area, and outputting sound information of the first audio and video data to the directional sound output module to make the directional sound output module output a directional sound signal towards the target visual area | S520 |

Fig. 5

AUDIO AND VIDEO PLAYING SYSTEM, PLAYING METHOD AND PLAYING DEVICE

CROSS-REFERENCE TO RELATED APPLICATIONS

This application is the U.S. national phase of PCT Application No. PCT/CN2021/090202 filed on Apr. 27, 2021, which claims priority to Chinese Patent Application No. 202010455829.6 filed in China on May 26, 2020, the entire contents of which are incorporated herein by reference.

TECHNICAL FIELD

The present application relates to the technical field of multimedia playing, and in particular to an audio and video playing system, a playing method and a playing device.

BACKGROUND

With the development of display technology, large screen display devices are gradually applied in various places, such as homes, parks and stations. In response to the different viewing needs of many people in public places, displaying pictures of different film sources in partitions has become the technology development trend of large screen display devices.

When a large screen display device displays pictures of at least two film sources in partitions, each picture of the film source respectively carries a sound source corresponding to the played film source, and how to ensure that a viewer can effectively listen to the sound of the picture of the film source he/she watches, so that the picture he/she watches corresponds to the sound he/she listens to is a technical problem to be solved when displaying pictures in partitions.

SUMMARY

An embodiment of the present application provides an audio and video playing system, including:
- a display device including a display screen;
- a directional sound output module configured to output a directional sound signal;
- a tracking element configured to monitor a target visual area within a visible range of the display screen for a viewer positioned within the visible range and to monitor a target display area on the display screen while the viewer viewing the display screen; and
- a processor, connected with the directional sound output module and the tracking element respectively, the processor being configured to acquire a first audio and video data to be output in the target display area, display image information of the first audio and video data in the target display area, and output sound information of the first audio and video data to the directional sound output module such that the directional sound output module output a directional sound signal towards the target visual area.

Optionally, in the audio and video playing system, the number of the directional sound output modules is at least two, and the at least two directional sound output modules correspond to the at least two target visual areas within the visible range on a one-to-one basis, and the processor is configured to output sound information of the first audio and video data to the directional sound output modules corresponding to the target visual areas where a viewer is located.

Optionally, in the audio and video playing system, the target display area is a first display area of the display screen, the processor is further configured to acquire second audio and video data to be output in a second display area of the display screen other than the first display area, and display an image of the second audio and video data in the second display area.

Optionally, in the audio and video playing system, the processor is further configured to: when it is determined that the target display area is switched from the first display area to the second display area, switch from outputting the sound information of the first audio and video data to the directional sound output module corresponding to the target visual area where the viewer is located, to outputting the sound information of the second audio and video data to the directional sound output module corresponding to the target visual area where the viewer is located.

Optionally, in the audio and video playing system, when outputting sound information of the first audio and video data to the sound direction output module corresponding to the target visual area where a viewer is located, the processor outputs the sound information of the first audio and video data to a first directional sound output module corresponding to the target visual area where a viewer is located among at least two directional sound output modules, and the processor is further configured to output the sound information of the second audio and video data to a second directional sound output module;
where the transmission direction of the directional sound signal output by the second directional sound output module is different from the transmission direction of the directional sound signal output by the first directional sound output module.

Optionally, in the audio and video playing system, the processor is further configured to acquire a plurality of audio and video data input to the display device, divide a display area of the display screen according to a plurality of the audio and video data, and determine the target display area and the first audio and video data output on the target display area.

Optionally, in the audio and video playing system, the processor is further configured to:
- divide the display screen into a plurality of display areas according to the number of the plurality of the audio and video data, wherein the number of display areas is equal to the number of the plurality of the audio and video data, and each of the display areas correspond to at least one of the directional sound output modules; and
- acquire audio and video data to be output in each display area, display image information of the audio and video data to be output in each display area on each display area, and output sound information of the audio and video data to be output in each display area to at least the one directional sound output module corresponding to each display area.

Optionally, in the audio and video playing system, the transmission directions of directional sound signals output by the directional sound output module correspond to different display areas are different.

Optionally, in the audio and video playing system, the directional sound output module includes an ultrasonic directional sounder and/or a phased loudspeaker array.

The processor is further configured to:
- divide the display screen into a plurality of display areas according to the number of the plurality of the audio and video data, wherein the number of display areas is equal to the number of the plurality of the audio and video data, and divide the ultrasonic directional sounder and/or the phased loudspeaker array into an equal number of ultrasonic directional sounder groups and/or phased loudspeaker array groups; and acquire audio and video data to be output in each display area, display image information of the audio and video data to be output in each display area in each display area, and output sound information of the audio and video data to be output in each display area to an ultrasonic directional sounder group and/or a phased loudspeaker array group corresponding to each display area.

Optionally, in the audio and video playing system, the transmission directions of directional sound signals output by the ultrasonic directional sound generator group and/or phased loudspeaker array group corresponding to different display areas are different.

Optionally, the audio and video playback system, where the directional sound output module includes an ultrasonic directional sounder and/or a phased loudspeaker array.

Optionally, in the audio and video playing system, the tracking element includes:

a first camera module configured to acquire an image in the visible range, and acquire a target visual area where a viewer is located in the visible range according to the acquired image; and a second camera module configured to perform eye tracking on the viewer to acquire eyeball state information; and acquiring a target display area on the display screen when the viewer viewing the display screen according to the eyeball state information.

Optionally, in the audio and video playing system, the second camera module includes an infrared camera element.

Another embodiment of the present application also provides a playing method for an audio and video playing system, where the audio and video playing system includes a display device and a directional sound output module capable of outputting a directional sound signal, and the method includes:

acquiring a target visual area where a viewer is located within a visible range of a display screen of the display device and a target display area on the display screen when the viewer is viewing the display screen; and displaying image information of a first audio and video data to be output in the target display area on the target display area, and outputting sound information of the first audio and video data to the directional sound output module, so that the directional sound output module outputs a directional sound signal towards the target visual area.

Optionally, the playing method, where when the number of the directional sound output modules is at least two, and the at least two directional sound output modules correspond to the at least two target visual areas within the visible range on a one-to-one basis, and outputting sound information of the first audio and video data to the directional sound output module includes:

outputting sound information of the first audio and video data to the directional sound output module corresponding to the target visual area where a viewer is located.

Optionally, the playing method, where when the target display area is the first display area of the display screen, the method further includes:

acquiring a second audio and video data to be output in a second display area of the display screen other than the first display area, and displaying an image of the second audio and video data in the second display area.

Optionally, the playing method, where the outputting sound information of the first audio and video data to the directional sound output module includes:

outputting sound information of the first audio and video data to a first directional sound output module corresponding to the target visual area where a viewer is located in at least two sound direction output modules;

The method further includes:

outputting sound information of the second audio and video data to a second directional sound output module;

where the transmission direction of the directional sound signal output by the second directional sound output module is different from the transmission direction of the directional sound signal output by the first directional sound output module.

The embodiment of the present application also provides a playing device of an audio and video playing system, where the audio and video playing system includes a display device and a directional sound output module capable of outputting a directional sound signal, and the apparatus includes:

an information acquisition module for acquiring, when a viewer is located within a visible range of a display screen of the display device, a target visual area where the viewer is located within the visible range, and a target display area on the display screen when the viewer views the display screen; and a processing module, used for displaying image information of the first audio and video data to be output in the target display area in the target display area, and outputting sound information of the first audio and video data to the directional sound output module, so that the directional sound output module outputs a directional sound signal towards the target visual area.

BRIEF DESCRIPTION OF THE DRAWINGS

FIG. 3 is a schematic structural diagram of one of the partition modes of a display screen in the audio and video playing system described according to the present application;

FIG. 4 is a schematic structural diagram of another partition mode of the display screen in the audio and video playing system described according to the present application;

FIG. 5 is a schematic flow chart of the playing method according to an embodiment of the present application.

DETAILED DESCRIPTION

In order to make the technical problems, technical solutions and advantages to be solved by the present application more clear, a detailed description will be made below with reference to the drawings and specific embodiments.

In order to ensure that a viewer can effectively listen to the sound of a film source picture he/she watches, without being interfered by the sound output by playing other film source pictures, the embodiments of the present application provide an audio and video playing system, where a tracking element and a directional sound output module are provided, which can determine a target visual area where a viewer is located and a target display area on a display screen when watching the display screen; a processor outputs an image of a first audio and video data to the target display area, and enables the directional sound output module to output a directional sound signal of the first audio data towards the target visual area, ensuring that a viewer can effectively listen to the sound of film source pictures (the first audio and video data) played in the target display area watched thereby, and the watched picture corresponds to the sound heard.

Figure 1:
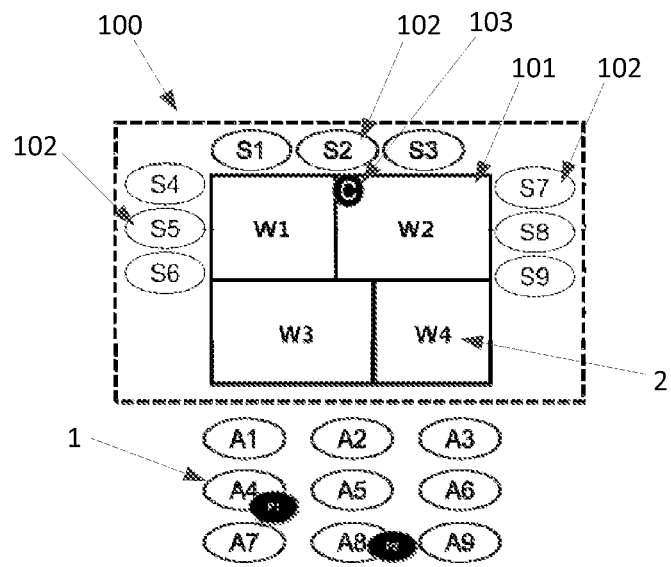
FIG. 1 is a schematic structural diagram of an audio and video playing system according to an embodiment of the present application.

An embodiment of the present application provides an audio and video playing system, and as shown in FIG. 1, the audio and video playing system includes:

- a display device 100 including a display screen 101;
- a directional sound output module 102 configured to output a directional sound signal;
- a tracking element 103 configured to monitor a target visual area 1 within a visible range of the display screen 101 where a viewer is located within the visible range, and to monitor a target display area 2 on the display screen 101 when viewing the display screen 101 by the viewer (indicated as P1 or P2 in FIG. 1); and
- a processor, connected with the directional sound output module 102 and the tracking element 103 respectively, the processor is configured to acquire a first audio and video data to be output in the target display area 2, display image information of the first audio and video data in the target display area 2, output sound information of the first audio and video data to the directional sound output module 102, such that the directional sound output module 102 outputs a directional sound signal towards the target visual area 1.

The audio and video playing system described according to the embodiments of the present application can monitor a target visual area where a viewer is located and a target display area on a display screen when viewing the display screen by providing a tracking element; by providing a directional sound output module, a directional sound signal can be output towards the target visual area, so that the processor can display the image of the first audio and video data to be output on the target display area on the target display area, and output sound information to the directional sound output module, so that the directional sound output module outputs the sound signal of the first audio and video data towards the target visual area, ensuring that a viewer located in the target visual area can effectively receive the sound of the audio and video data played by the target display area when viewing the target display area, and making the viewed picture correspond to the sound heard.

In the embodiment of the present application, optionally, in the audio and video playing system, the directional sound output module 102, the tracking element 103 and the processor are all mounted on the display device 100.

With this embodiment, the audio and video playing system is integrated with a directional sound output module 102 and a tracking element 103, which can realize the following of a viewer's viewing position and viewing gaze, and directionally transmit sound information corresponding to an image picture viewed by the viewer to a viewing position where the viewer is located.

In the embodiment of the present application, optionally, the target display area 2 is a first display area of the display screen 101, namely, a part of the display area of the display screen 101, and the processor is further configured to acquire a second audio and video data to be output in a second display area on the display screen 101, and display an image of the second audio data in the second display area.

Optionally, the display screen 101 may include a plurality of display areas, and each display area may respectively output an image picture corresponding to displaying one piece of audio and video data, and different display areas may display image pictures of different audio and video data.

The target display area 2 is any one of a plurality of display areas (e.g. including W1, W2, W3 and W4 in FIG. 1, the four display areas) of the display screen 101, and the target visual area 1 is any one area within the visible range of the display screen.

With this embodiment, on the display screen 101, image pictures of different audio and video data are displayed in partitions, each audio and video data respectively including corresponding sound information, and a viewer located in any area within the visible range of the display screen 101 can listen to a sound signal corresponding to the viewed image picture when viewing one of the display areas of the display screen.

Optionally, when outputting the sound information of the first audio and video data to a directional sound output module, the processor outputs the sound information of the first audio and video data to the first directional sound output module of the at least two directional sound output modules, and the processor is further configured to output the sound information of the second audio and video data to a second directional sound output module;

The transmission direction of the directional sound signal output by the second directional sound output module is different from the transmission direction of the directional sound signal output by the first directional sound output module.

With this embodiment, different directional sound output modules can output different sound signals to different visual areas at the same time, so as to be able to meet the corresponding synchronous sound acquisition requirements of different viewers when watching different picture images at the same time.

In an embodiment of the present application, optionally, the processor is further configured to:

when it is determined that the target display area 2 is switched from the first display area to the second display area, switch from outputting the sound information of the first audio and video data to the directional sound output module 102 to outputting the sound information of the second audio and video data to the directional sound output module 102.

With this embodiment, the audio and video playing system can track a display area viewed by a viewer on the display screen 101, and when it is determined that the viewed display area is switched, switch the sound information output to the directional sound output module 102, so that the sound outputting by the directional sound output module 102 towards the target visual area is switched, and a viewer located in the target visual area can listen to the sound corresponding to the currently viewed image picture in real time.

In the embodiment of the present application, optionally, the number of the directional sound output modules 102 is at least two, at least two of the directional sound output modules 102 correspond to at least two visual areas within the visible range on a one-to-one basis, and the processor, when outputting the sound information of the first audio and video data to the directional sound output module 102, is configured to output the sound information of the first audio and video data to the directional sound output module 102 corresponding to the target visual area 1 where the viewer is located.

Optionally, of the at least two directional sound output modules 102, different ones of the directional sound output modules 102 are configured to be capable of outputting directional sound signals towards different visual areas within the visible range.

As shown in FIG. 1, when the visible range of the display screen is set to include visual areas A1, A2, A3 ... A9, a total of 9 visual areas, then S1, S2, S3, ... S9 can be set on the display device 100, a total of 9 directional sound output modules, each directional sound output module respectively corresponding to a visual area, and the directional sound output module is used for outputting a directional sound signal to the corresponding visual area.

With this embodiment, the processor is configured to record a corresponding relationship between the directional sound output module and the visual area, and when the sound information of the first audio and video data is output to the directional sound output module, the sound information of the first audio and video data is output to the directional sound output module corresponding to the target visual area.

Further, when a viewer watching a target display area moves from a first visual area to a second visual area, the processor can output sound information of the first audio and video data to a first directional sound output module corresponding to the first visual area, and switch the outputting to a second directional sound output module corresponding to the second visual area, so that the viewer moving to the second visual area can continue to effectively listen to a sound signal corresponding to an image picture of the viewed target display area in the second visual area.

Furthermore, with this implementation structure, for viewers located in different visual areas within the visible range, directional sound signals can be respectively output to the corresponding visual areas through different directional sound output modules, so that the viewers in the different visual areas can respectively acquire the sound signals of the corresponding viewed image pictures.

Optionally, in the embodiment of the present application, the display screen may be divided into at least two display areas, and the at least two display areas may also have a corresponding relationship with a plurality of visual areas within the visible range, and each display area may have a corresponding relationship with at least one visual area, but may also have a corresponding relationship with at least two visual areas.

With this embodiment, when a plurality of viewers located in the same visual area simultaneously view the image frames displayed in the corresponding display area, corresponding sound signals can be acquired. Optionally, when a plurality of viewers are included in one of the viewable areas, and when one of the viewers located in the same visual area desires to view a display area that does not correspond to the visual area and the status of the viewer viewing the display area that does not correspond to the visual area is monitored by the tracking element, to ensure that each of the viewers can view the image frame and hear a corresponding sound signal, the processor may be configured to issue a prompt message to the viewers prompting the viewers to view the display area that does not correspond to the visual area if desired. The visual area corresponding to the desired visual display area may then be moved to acquire a sound signal at the visual area corresponding to the image frame of the desired visual display area.

For example, a first display area of a display screen has a corresponding relationship with a first visual area within a visible range, a second display area of the display screen has a corresponding relationship with the second visual area within the visible range, and further, the first display area has a corresponding relationship with a first directional sound output module, and the second display area has a corresponding relationship with a second directional sound output module. When a viewer is located in the first visual area to view an image picture of the first display area, a sound signal corresponding to the image picture displayed by the first display area can be acquired through the first directional sound output module; when a plurality of viewers are included in the first visual area, if one of the viewers is currently watching the image picture of the second display area, the state can be monitored by the tracking element; in order to ensure that other viewers in the first visual area can normally acquire the sound signal corresponding to the image picture displayed in the first display area, the processor can send a reminding message to the viewer to remind the viewer to move to the second visual area, so that the viewer can watch the image picture of the second display area in the second visual area; and a sound signal corresponding to the image picture of the second display area is heard by the second directional sound output module. Optionally, warning information can be sent out via a common speaker provided on a display device; optionally, the reminding information can also be sent out via the first directional sound output module.

In one embodiment of the audio and video playing system described in the embodiments of the present application, the directional sound output module includes an ultrasonic directional sound generator.

The ultrasonic directional sounder uses the ultrasonic wave to propagate outward in a columnar shape and has a good directivity characteristic. The ultrasonic wave is selected as the carrier wave, and the audible sound signal is modulated onto the ultrasonic carrier wave by radio amplitude modulation technology, and the amplitude modulation wave is transmitted by the transducer to realize the directional propagation of the sound signal.

The specific principles are: according to the acoustic parametric technique, when two beams of ultrasonic waves propagate in the air, a variety of harmonics are generated. In addition to the difference frequency sound wave, the other harmonics are high frequency ultrasonic waves, but in the process of different frequencies of ultrasonic waves propagating in the air, due to the non-linear acoustic effect of the air, different frequencies of ultrasonic signals will interact and self-demodulate, thereby generating new waves with frequencies including the sum frequency and difference frequency of the original ultrasonic waves. On this basis, if the ultrasonic wave is selected appropriately, the difference frequency sound wave can fall in the audible sound domain, and since the ultrasonic wave has a high directivity, the difference frequency wave generated by the interaction in the propagation process also has a high directivity, so as to realize the directional propagation of the sound signal, namely, directional sounding. Further, general audio frequency can realize sound fixed-point sounding by using the interference principle of constant amplitude ultrasonic wave and amplitude modulation ultrasonic wave.

Therefore, by using the above-mentioned principle and using radio amplitude modulation technology, an audible audio signal of a human ear is modulated into an ultrasonic signal, and is transmitted and propagated through an ultrasonic transducer; and by using the non-linear effect of air, the sound which is the same as the original audio signal and can be heard by the human ear can be recovered, and the directivity thereof can achieve the effect substantially the same as that of an ultrasonic signal of 40 kHz.

Optionally, the ultrasonic directional sounder includes an ultrasonic wave generating circuit, a modulating circuit, a filtering circuit, a power amplifying circuit, an ultrasonic transducer, etc.

According to the above, when the directional sound output module includes an ultrasonic directional sounder, by outputting the played sound information to the ultrasonic directional sounder, by modulating the sound information into an ultrasonic signal, and using an ultrasonic transducer to transmit and propagate, the sound information can be directionally transmitted to the target visual area.

In another embodiment of the audio and video playing system according to an embodiment of the present application, the directional sound output module includes a phased loudspeaker array.

It should be noted that a single loudspeaker unit is generally omnidirectional radiation, and adding a horn to the loudspeaker unit can make the sound field of the sound emitted by the loudspeaker unit have a certain directivity, and optimizing the structure of the horn can improve the directivity of the sound field of a single loudspeaker to a certain extent, especially the directivity of the sound field in a high frequency band. However, at low frequencies, the width of the main beam of the single loudspeaker unit is still relatively large and the energy of the sound field propagates in all directions. Meanwhile, since a single speaker unit radiates a limited power, it is required that a plurality of speaker units cooperate with each other for an occasion requiring a large power of acoustic energy. The loudspeaker array can control the radiation of sound field energy in a certain range. Based on a loudspeaker array with a specific geometry, the directional control of the spatial sound field is achieved by using corresponding signal processing algorithms to form a specific sound field, such as improving directivity and radiation width. Thus, by improving the radiation area of the sound field of the array loudspeaker system, as well as the directivity, the sound perception of the listener can be greatly improved.

According to the above-mentioned principle, by forming an array loudspeaker system by arranging a plurality of loudspeaker units according to a certain geometric structure (for example, arranging same in the form of a one-dimensional linear array, a two-dimensional surface array or a three-dimensional volume array, etc.), and combining the loudspeaker arrays arranged according to the geometric structure, performing signal processing on the electrical signals applied by the loudspeaker units, including processing electrical characteristic quantities such as amplitude, phase and frequency, etc. different spatial sound field distributions can be acquired.

Therefore, in the audio and video playing system according to the embodiment of the present application, on the basis of determining the position of a vocalization target and the position of a viewer, by outputting the played sound information to a phased loudspeaker array and processing the sound information by using a certain sound signal processing method, a sound signal with high directivity which can be transmitted to the viewer position is formed.

In an embodiment of the present application, optionally, a phased loudspeaker array provided by an audio and video playing system may be a group, including a plurality of loudspeaker units, and through the phased loudspeaker array provided, after a target visual area where a viewer is located within the visible range is monitored by using a tracking element, and the viewer watches the display screen and the target display area on the display screen, a processor may transmit sound information of the first audio and video data to be output in the target display area to the phased loudspeaker array; the phased speaker array is caused to output a directional sound signal towards the determined target visual area.

On this basis, when it is monitored by the tracking element that the viewer moves from the first visual area to the second visual area within the visible range, the processor transmits the sound information of the first audio and video data to be output in the target display area to the phased speaker array, and also sends a direction switching signal to the phased speaker array, so that the directional sound signal output by the phased speaker array is switched from the first visual area to the second visual area.

Optionally, when the phased loudspeaker array provided by the audio and video playing system can be a group, if a plurality of viewers in the visual area are detected, respectively in different areas, the phased loudspeaker can be made to radiate omnidirectionally so as to meet the sound receiving requirements of different viewers.

In a large indoor closed environment, the ordinary sound source has a large volume of space, resulting in long reverberation time, and the resulting sound field speech clarity is reduced, turbid and unclear, which is unfavorable for the transmission of sound information. The ability of the loudspeaker array to reconstruct the sound field mitigates and ameliorates this problem. Since the loudspeaker array can form a sound field with a very high directivity, changing the radiation mode of sound from spherical wave radiation to a radiation mode similar to a cylindrical wave, the attenuation of sound energy is slower, and the situation where the near-field sound pressure is particularly large and the far-field sound pressure is particularly small is effectively improved. Based on these advantages, phased loudspeaker arrays can be used in many applications, such as news hearings, churches, etc.

Figure 2:
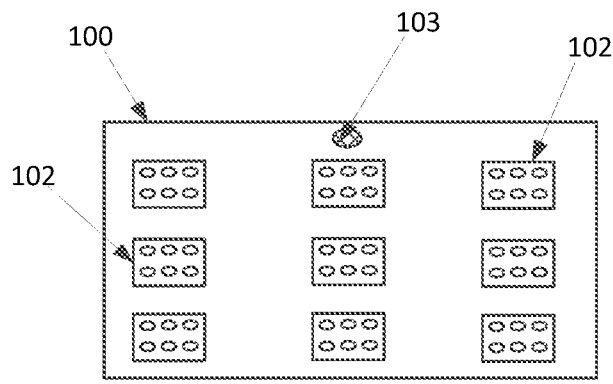
FIG. 2 is a schematic structural diagram of a directional sound output module including multiple groups of phased loudspeaker arrays in the audio and video playing system according to the present application.

Optionally, the phased loudspeaker arrays provided by the audio and video playing system can be at least two groups, and the phased loudspeaker arrays of each group respectively include a plurality of loudspeaker units, as shown in FIG. 2, where the phased loudspeaker arrays of each group are formed as an directional sound output module 102, and the phased loudspeaker arrays of multiple groups correspond to at least two visual areas within a visible range on a one-to-one basis, such that the acoustic information corresponding to different image pictures can be output to different visual areas by using the phased loudspeaker arrays of multiple groups; sound reception by viewers located in different visual areas while viewing different display areas is satisfied.

In an embodiment of the present application, optionally, the processor is further configured to acquire a plurality of audio and video data input to the display device, divide a display area of the display screen 101 according to the plurality of audio and video data, determine a target display area and the first audio and video data output in the target display area.

It should be noted that a plurality of audio and video data respectively correspond to different scene image pictures, and the processor determines the number of partitions of the display area according to the number of audio and video data input to the display device 100, and divides the display area.

For example, when the number of audio and video data input to the display device 100 is three, the processor may form three display areas as shown in FIG. 3 after dividing the display area; and when the number of the audio and video data input to the display device 100 is four, the processor may form four display areas as shown in FIG. 4 after dividing the display area.

The above-mentioned structural form of region division for a display region is merely an example and is not limited thereto.

In an embodiment of the present application, optionally, as shown in FIG. 1, the tracking element 103 includes:
- a first camera module configured to acquire an image in a visible range, and acquire a target visual area where a viewer is located in the visible range according to the acquired image; and
- a second camera module configured to perform eye tracking on a viewer to acquire eyeball state information; and acquiring, according to the eyeball state information, a target display area on a display screen of the viewer when viewing the display screen.

Specifically, a target visual area in which the viewer is located can be determined through an image within a visible range collected by using a first camera module and performing a comparative analysis on the collected image and a pre-stored image of the visible range.

Tracking an eyeball of a viewer by using the second camera module to acquire eyeball state information, and according to the eyeball state information, a target display area on the display screen when the viewer viewing the display screen can be determined.

Optionally, the second camera module can include, but is not limited to, only an infrared camera element.

Optionally, in one embodiment, the first camera module and the second camera module can integrate an image acquisition function and an image analysis and processing function; in another embodiment, on the first camera module and the second camera module, the image acquisition function and the image analysis and processing function can be independent, for example, a chip having the image analysis and processing function can be separated from the first camera module and the second camera module, for example, integrated on a processor.

It should be noted that a person skilled in the art, according to the audio and video playing system described in the embodiment of the present application, would have been able to learn the specific manner of performing eye tracking via the second camera module to determine the target display area on the display screen when the viewer viewing the display screen, and this will not be described in detail herein.

The audio and video playing system described in the embodiments of the present application can realize the display of multiple scenes in partitions on a display screen, transmit the sound of a watched scene to a region where a viewer is located in real time according to the difference of the scenes watched by the viewer, realize an audio-visual linkage effect centered on the viewer, ensure the synchronization of the sound and the picture image watched, and at the same time avoid the problems of sound reverberation and low privacy caused by omnidirectional radiation of an ordinary loudspeaker. Furthermore, directional sound output modules are respectively provided corresponding to different visual areas, and by switching the sound signals of the directional sound output modules, the requirements of enjoying different image scenes in the same visual area can be satisfied.

Another embodiment of the present application also provides a playing method for an audio and video playing system, where the audio and video playing system includes a display device and a directional sound output module capable of outputting a directional sound signal, and as shown in FIG. 5, the method includes:

S510, when a viewer is located within a visible range of a display screen of the display device, acquiring a target visual area where the viewer is located within the visible range and a target display area on the display screen when the viewer views the display screen;

S520, displaying image information of a first audio and video data to be output in the target display area in the target display area, and outputting sound information of the first audio and video data to the directional sound output module to make the directional sound output module output a directional sound signal towards the target visual area.

Optionally, when the number of the directional sound output modules is at least two, and the at least two directional sound output modules correspond to the at least two target visual areas within the visible range on a one-to-one basis, and in step S520, outputting sound information of the first audio and video data to the directional sound output module includes:
- outputting sound information of the first audio and video data to the directional sound output module corresponding to the target visual area where a viewer is located.

Optionally, the playing method, where when the target display area is the first display area of the display screen, the method further includes:
- acquiring a second audio and video data to be output in a second display area of the display screen other than the first display area, and displaying an image of the second audio and video data in the second display area.

Optionally, the playing method, where in step S520, outputting sound information of the first audio and video data to the directional sound output module includes:
- outputting sound information of the first audio and video data to the first directional sound output module of at least two directional sound output modules;

Optionally, the method further includes:
- outputting sound information of the second audio and video data to the second directional sound output module;
- where the transmission direction of the directional sound signal output by the second directional sound output module is different from the transmission direction of the directional sound signal output by the first directional sound output module.

Optionally, the method further includes:
- when it is determined that the target display area is switched from the first display area to the second display area, switching from outputting the sound information of the first audio and video data to the directional sound output modules, to outputting the sound information of the second audio and video data to the directional sound output modules.

Figure 6:
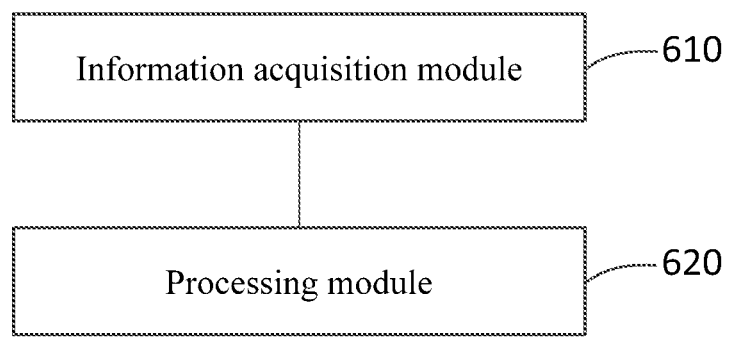
FIG. 6 is a schematic structural diagram of the playing device according to an embodiment of the present application.

Another embodiment of the present application also provides a playing device of an audio and video playing system, where the audio and video playing system includes a display device and a directional sound output module capable of outputting a directional sound signal, and as shown in FIG. 6, the apparatus includes:

an information acquisition module 610 for acquiring, when a viewer is located within a visible range of a display screen of the display device, a target visual area where the viewer is located within the visible range and a target display area on the display screen when the viewer views the display screen; and a processing module 620 for displaying image information of the first audio and video data to be output in the target display area in the target display area, and outputting sound information of the first audio and video data to the directional sound output module, so that the directional sound output module outputs a directional sound signal towards the target visual area.

Optionally, the playing device, where when the number of the directional sound output modules is at least two, and the at least two directional sound output modules correspond to the at least two target visual areas within the visible range on a one-to-one basis, the processing module 620 outputs sound information of the first audio and video data to the directional sound output module, including:

outputting sound information of the first audio and video data to the sound direction output module corresponding to the target visual area where a viewer is located.

Optionally, the playing device, where when the target display area is the first display area of the display screen, the processing module 620 is further used for:

acquiring a second audio and video data to be output in a second display area of the display screen other than the first display area, and displaying an image of the second audio and video data in the second display area.

Optionally, the playing device, where a processing module 620 outputs sound information of the first audio and video data to the directional sound output module, including:

outputting sound information of the first audio and video data to a first directional sound output module of at least two directional sound output modules;

The processing module 620 is also configured to:

output sound information of the second audio and video data to a second directional sound output module;

where the transmission direction of the directional sound signal output by the second directional sound output module is different from the transmission direction of the directional sound signal output by the first directional sound output module.

Optionally, the processing module 620 is further configured to:

when it is determined that the target display area is switched from the first display area to the second display area, perform the step of switch outputting the sound information of the first audio and video data to the directional sound output modules to outputting the sound information of the second audio and video data to the directional sound output modules.

With the playing method and playing device described in the embodiments of the present application, it can be ensured that a viewer located in the target visual area effectively receives the sound of the audio and video data played by the target display area when watching the target display area, so that the viewed picture corresponds to the sound heard.

While the foregoing is directed to optional embodiments of the present invention. It should be noted out that ordinary people in the art can make some improvements and retouching without departing from the principles described in this application, and these improvements and retouching should also be regarded as the scope of protection of this application.

What is claimed is:

1. An audio and video playing system, comprising:
a display device, comprising a display screen;
a directional sound output module, configured to output a directional sound signal;
a tracking element, configured to monitor a target visual area within a visible range of the display screen for a viewer positioned within the visible range, and to monitor a target display area on the display screen for the viewer while viewing the display screen; and
a processor, connected with the directional sound output module and the tracking element respectively, the processor being configured to acquire a first audio and video data to be output in the target display area, display image information of the first audio and video data in the target display area, and output sound information of the first audio and video data to the directional sound output module such that the directional sound output module output a directional sound signal towards the target visual area;
wherein the processor is further configured to acquire a plurality of audio and video data input to the display device, divide the display screen into display areas according to the plurality of audio and video data, and determine the target display area and the first audio and video data to be output in the target display area.

2. The audio and video playing system according to claim 1, wherein the number of directional sound output modules is at least two, the at least two directional sound output modules correspond to the at least two target visual areas within the visible range, and the processor is configured to output sound information of the first audio and video data to the directional sound output modules corresponding to the target visual areas where viewers are located.

3. The audio and video playing system according to claim 1, wherein the target display area is a first display area of the display screen, and the processor is further configured to acquire a second audio and video data to be output in a second display area of the display screen other than the first display area, and to display an image of the second audio and video data in the second display area.

4. The audio and video playing system according to claim 3, wherein the processor is further configured to: when it is determined that the target display area is switched from the first display area to the second display area, switching from outputting the sound information of the first audio and video data to the directional sound output module corresponding to the target visual area where the viewer is located, to outputting the sound information of the second audio and video data to the directional sound output module corresponding to the target visual area where the viewer is located.

5. The audio and video playing system according to claim 3, wherein the processor is configured to, when outputting the sound information of the first audio and video data to the directional sound output module corresponding to the target visual area where the viewer is located, output the sound information of the first audio and video data to a first directional sound output module corresponding to the target visual area where the viewer is located among at least two directional sound output modules, and the processor is further configured to output the sound information of the second audio and video data to a second directional sound output module;

wherein the transmission direction of the directional sound signal output by the second directional sound output module is different from the transmission direction of the directional sound signal output by the first directional sound output module.

6. The audio and video playing system according claim 1, wherein the processor is further configured to: divide the display screen into a plurality of display areas according to the number of the plurality of the audio and video data, wherein the number of display areas is equal to the number of the plurality of the audio and video data, and each of the display areas correspond to at least one of the directional sound output modules; and acquire audio and video data to be output in each display area, display image information of the audio and video data to be output in each display area on each display area, and output sound information of the audio and video data to be output in each display area to at least one of the directional sound output module corresponding to each display area.

7. The audio and video playing system according to claim 6, wherein the transmission directions of directional sound signals output by the directional sound output modules corresponding to different display areas are different.

8. The audio and video playing system according to claim 1, wherein the directional sound output module comprises an ultrasonic directional sounder and/or a phased loudspeaker array, the processor is further configured to: divide the display screen into a plurality of display areas according to the number of the plurality of the audio and video data, wherein the number of display areas is equal to the number of the plurality of the audio and video data, and divide the ultrasonic directional sounder and/or the phased loudspeaker array into an equal number of ultrasonic directional sounder groups and/or phased loudspeaker array groups; and acquire audio and video data to be output in each of the display areas, display image information of the audio and video data to be output in each display area on the display area, and output sound information of the audio and video data to be output in each display area to an ultrasonic directional sounder group and/or a phased loudspeaker array group corresponding to the display area.

9. The audio and video playing system according to claim 8, wherein the transmission directions of the directional sound signals output by the ultrasonic directional sounder groups and/or the phased loudspeaker array groups for different display areas are different.

10. The audio and video playing system according to claim 1, wherein the directional sound output module comprises an ultrasonic directional sounder and/or a phased loudspeaker array.

11. The audio and video playing system according to claim 1, wherein the tracking element comprises:
a first camera module configured to acquire an image within the visible range, and acquire a target visible area where a viewer is located within the visible range according to the acquired image; and
a second camera module configured to perform eye tracking on the viewer to acquire eyeball state information; and acquire a target display area on the display screen when the viewer viewing the display screen according to the eyeball state information.

12. The audio and video playing system according to claim 11, wherein the second camera module comprises an infrared camera element.

13. A playing method for an audio and video playing system, wherein the audio and video playing system comprises a display device and a directional sound output module capable of outputting a directional sound signal, the method comprising:
acquiring a target visual area where a viewer is located within a visible range of a display screen of the display device and a target display area on the display screen when the viewer is viewing the display screen; and
displaying image information of a first audio and video data to be output in the target display area on the target display area, and outputting sound information of the first audio and video data to the directional sound output module, such that the directional sound output module outputs a directional sound signal towards the target visual area;
wherein the method further comprises: acquiring a plurality of audio and video data input to the display device, dividing the display screen into display areas according to the plurality of audio and video data, and determining the target display area and the first audio and video data to be output in the target display area.

14. The playing method according to claim 13, wherein when the number of the directional sound output modules is at least two, the at least two directional sound output modules correspond to the at least two target visual areas within said visible range on a one-to-one basis, and outputting sound information of the first audio and video data to the directional sound output module comprises:
outputting sound information of the first audio and video data to the directional sound output module corresponding to the target visual area where a viewer is located.

15. The playing method according to claim 13, wherein when the target display area is the first display area of the display screen, the method further comprises:
acquiring a second audio and video data to be output in a second display area of the display screen other than the first display area, and displaying an image of the second audio and video data in the second display area.

16. The playing method according to claim 15, wherein outputting sound information of the first audio and video data to the directional sound output module comprises:
outputting sound information of the first audio and video data to the first directional sound output module corresponding to the target visual area where a viewer is located in at least two directional sound output modules;
the method further comprises:
outputting sound information of the second audio and video data to a second directional sound output module;
wherein the transmission direction of the directional sound signal output by the second directional sound output module is different from the transmission direction of the directional sound signal output by the first directional sound output module.

17. A playing device of an audio and video playing system, wherein the audio and video playing system comprises a display device and a directional sound output module capable of outputting a directional sound signal, and the playing device comprises:
an information acquisition module for acquiring, when a viewer is located within a visible range of a display screen of the display device, a target visual area where the viewer is located within the visible range, and a target display area on the display screen when the viewer views the display screen; and
a processing module, configured for displaying image information of the first audio and video data to be output in the target display area on the target display area, and outputting sound information of the first audio and video data to the directional sound output module, such that the directional sound output module outputs a directional sound signal towards the target visual area;

wherein the processing module is further configured to acquire a plurality of audio and video data input to the display device, divide the display screen into display areas according to the plurality of audio and video data, and determine the target display area and the first audio and video data to be output in the target display area.

\* \* \* \* \*